United States Patent
Miao et al.

(10) Patent No.: US 11,533,459 B2
(45) Date of Patent: Dec. 20, 2022

(54) PROJECTOR AND BRIGHTNESS ADJUSTING METHOD

(71) Applicant: Coretronic Corporation, Hsin-Chu (TW)

(72) Inventors: Yun-Lin Miao, Hsin-Chu (TW); Wen-Chang Chien, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/698,966

(22) Filed: Nov. 28, 2019

(65) Prior Publication Data

US 2020/0177855 A1 Jun. 4, 2020

(30) Foreign Application Priority Data

Nov. 30, 2018 (CN) .......................... 201811454287.X (51) Int. Cl.
 *H04N 9/31* (2006.01)
(52) U.S. Cl.
 CPC ......... *H04N 9/3182* (2013.01); *H04N 9/3185* (2013.01); *H04N 9/3194* (2013.01)
(58) Field of Classification Search
 CPC .. H04N 9/3194; H04N 9/3182; H04N 9/3185; H04N 9/31; G09G 2320/0626; G03B 21/14; G03B 21/2053
 See application file for complete search history.

(56) References Cited

U.S. PATENT DOCUMENTS

| 5,483,299 | A  | 1/1996  | Minoura |
| 6,634,757 | B2 | 10/2003 | Asakawa |
| 7,278,744 | B2 | 10/2007 | Nonaka |
| 7,300,160 | B2 | 11/2007 | Nakamura |
| 7,545,937 | B2 | 6/2009  | Rumreich |
| 7,614,753 | B2 | 11/2009 | Zavarehi et al. |
| 7,866,823 | B2 | 1/2011  | Asai |

(Continued)

FOREIGN PATENT DOCUMENTS

| CN | 1991571     | 7/2007 |
| DE | 102006036061 | 2/2008 |

OTHER PUBLICATIONS

"Office Action of U.S. Appl. No. 16/937,595", dated Oct. 15, 2020, pp. 1-18.

*Primary Examiner* — Sherrie Hsia
(74) *Attorney, Agent, or Firm* — JCIPRNET (57) ABSTRACT

A projector and a brightness adjusting method are provided. The projector includes a distance sensor configured to detect a distance between the projector and a projection plane, a light source configured to provide an illumination beam, a brightness controlling circuit configured to control the light source, and a processor coupled to the distance sensor, the light source, and the brightness controlling circuit. The processor calculates according to the distance to obtain an image size of a projected image on the projection plane. The processor obtains a current value corresponding to the image size according to a color table. The processor instructs the light source to adjust a luminous flux of the illumination beam according to the current value for generating a target brightness value of the projected image. When a brightness of the projected image is excessively large, a brightness of an image beam of the projector is automatically reduced.

20 Claims, 8 Drawing Sheets

(56) References Cited

U.S. PATENT DOCUMENTS

| | | |
|---|---|---|
| 8,506,093 B2 | 8/2013 | Kato |
| 9,004,698 B2 | 4/2015 | Kilcher et al. |
| 9,215,431 B2 | 12/2015 | Nakashin |
| 9,299,321 B2* | 3/2016 | Ohno ................ H04N 9/3147 |
| 9,588,408 B1 | 3/2017 | Linnell |
| 9,664,376 B2 | 5/2017 | Abe et al. |
| 9,843,781 B1* | 12/2017 | Furui ................ H04N 5/232 |
| 10,321,104 B2 | 6/2019 | Ma |
| 10,516,864 B2* | 12/2019 | Otani ................ H04N 13/246 |
| 2005/0094110 A1 | 5/2005 | Nakamura |
| 2007/0252955 A1 | 11/2007 | Asai |
| 2008/0212039 A1 | 9/2008 | Taylor |
| 2009/0027571 A1 | 1/2009 | Amano |
| 2009/0174638 A1 | 7/2009 | Brown Elliott et al. |
| 2009/0219493 A1 | 9/2009 | Okubo et al. |
| 2010/0134643 A1* | 6/2010 | Koishi ................ G03B 29/00 348/222.1 |
| 2010/0135534 A1* | 6/2010 | Weston ................ G01B 11/007 382/106 |
| 2011/0299044 A1 | 12/2011 | Yeh et al. |
| 2011/0304833 A1* | 12/2011 | Osaka ................ G03B 21/00 353/85 |
| 2012/0069415 A1 | 3/2012 | Freeman et al. |
| 2012/0113107 A1 | 5/2012 | Jang |
| 2012/0182307 A1* | 7/2012 | Ueno ................ G03B 21/14 345/589 |
| 2013/0244733 A1* | 9/2013 | Ueno ................ H04M 1/0214 455/566 |
| 2014/0293243 A1* | 10/2014 | Furui ................ H04N 9/3185 353/69 |
| 2015/0015730 A1* | 1/2015 | Choi ................ H04N 5/23222 348/211.1 |
| 2015/0350615 A1* | 12/2015 | Ono ................ G06F 3/0418 348/140 |
| 2016/0173840 A1* | 6/2016 | Kurakake ............ H04N 9/3185 348/745 |
| 2016/0351133 A1 | 12/2016 | Kim et al. |
| 2017/0068153 A1 | 3/2017 | Ikeura et al. |
| 2017/0208307 A1* | 7/2017 | Ichieda ................ H04N 9/3194 |
| 2017/0229099 A1 | 8/2017 | Mito |
| 2018/0091784 A1 | 3/2018 | Dutton et al. |
| 2018/0143443 A1 | 5/2018 | Fujita |
| 2018/0226055 A1 | 8/2018 | Raymann et al. |
| 2020/0081329 A1 | 3/2020 | Cheng |
| 2020/0177854 A1 | 6/2020 | Miao |

* cited by examiner

PROJECTOR AND BRIGHTNESS ADJUSTING METHOD

CROSS-REFERENCE TO RELATED APPLICATION

This application claims the priority benefit of China application serial no. 201811454287.X, filed on Nov. 30, 2018. The entirety of the above-mentioned patent application is hereby incorporated by reference herein and made a part of this specification.

BACKGROUND OF THE INVENTION

Field of the Invention

The invention relates to a projector and a brightness adjusting method; more particularly, the invention relates to a projector capable of automatically adjusting a brightness of the projector to comply with the Society of Motion Picture and Television Engineers (SMPTE) brightness standard according to an image size of a projected image.

Description of Related Art

In general, the greater the brightness of projectors, the more welcome the projectors to the average users. However, if a projector with high brightness is used to project an image on a small projection screen while performing the above operation in an environment where the light is turned off, it is easy to cause eye fatigue of the user or even damages to the eyes of the user due to excessive brightness of the projection screen.

People are often confused by the concept of lumen and brightness. Lumen is the unit of luminous flux and a measure of total quantity of radiated light per unit time, and can also be understood as the number of photons emitted by a light source per unit time. Brightness is the perception elicited by the brightness of a target and can be defined as a light emitting intensity per unit area. The unit of brightness is nit. One nit equals one candela per square meter (1 nit=lcd/m$^2$). The user perceives the brightness of the projector through the reflected image on a projection plane. For instance, when the projector projects a video beam with a fixed luminous flux of 3000 lumens onto projected images of different sizes, the closer the projection distance, the smaller the projected image size and the greater the brightness of the projected image. By contrast, the farther the projection distance, the greater the projected image size and the less the brightness of the projected image.

According to the research of the Society of Motion Picture and Television Engineers (SMPTE), the optimal luminance in a completely dark environment where people watch images is about 14 fL (foot-lamberts). Given said optimal luminance, color recognition, perception of image details, and human eye comfort are optimal. Accordingly, the screen luminance of movies are required to fall within a range of 14±2 fL. The range of 14±2 fL is equivalent to a range of 41 nits-55 nits.

The lumen value of commercially available home theater projectors is mostly from 1500 lumens to 3000 lumens, and the image size of normal projectors used at home for watching movies is often from 60" to 150". Table 1 shows the corresponding relationship between the image size of the 1500-3000-lumen projector and the brightness of the projected image.

TABLE 1

| Image Size (inch) | 1500 lumens brightness (nit) | 2000 lumens brightness (nit) | 3000 lumens brightness(nit) |
|---|---|---|---|
| 60" | 457 | 610 | 915 |
| 70" | 336 | 448 | 672 |
| 80" | 257 | 343 | 515 |
| 90" | 203 | 271 | 407 |
| 100" | 165 | 220 | 329 |
| 110" | 136 | 181 | 272 |
| 120" | 114 | 152 | 229 |
| 130" | 97 | 130 | 195 |
| 140" | 84 | 112 | 168 |
| 150" | 73 | 98 | 146 |

From Table 1, it can be learned that the brightness of the 1500-3000 lumens of the projector at all image sizes is far greater than 41 nits to 55 nits recommended by the SMPTE. Since most home theater projectors do not make the best adjustments to the brightness of the images watched, viewers are unlikely to watch a 1-3 hour movie comfortably, and the quality of the images watched by the viewers is also affected. On the other hand, the existing solid-state light source projector can only adjust the current in the high brightness region when adjusting the current of the light source but cannot adjust the current in the low brightness region (e.g., adjusting the current so that the brightness of the light source is less than 10% of the predetermined brightness). Under said configuration, even though the brightness of the projector is adjusted to the smallest value, the brightness of the projected image is greater than 41 nits to 55 nits recommended by the SMPTE. Besides, the light sources of the existing projectors often encounter the issue of brightness decay and color distortion after the light sources are used for a period of time. However, the existing projectors do not have any mechanism of detecting the brightness decay to maintain the brightness and the color.

Accordingly, people skilled in the pertinent art are endeavored to learn how to automatically reduce the brightness of the projector to comply with the SMPTE brightness standard while the projected image is excessively bright and how to maintain the brightness and the color for a long period of time.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be solved by one or more embodiments of the invention was acknowledged by people of ordinary skill in the pertinent art.

SUMMARY OF THE INVENTION

The invention provides a projector and a brightness adjusting method for automatically reducing the brightness of the projector to comply with the Society of Motion Picture and Television Engineers (SMPTE) brightness standard while the projected image is excessively bright and for maintaining the brightness and the color for a long period of time.

Other advantages can be further illustrated by the technical features broadly embodied and described as follows.

In order to achieve one or a portion of or all of the objectives or other objectives, an embodiment of the invention provides a projector including a distance sensor, a light source, a brightness controlling circuit, and a processor. The distance sensor is configured to detect a distance between the projector and a projection plane. The light source is configured to provide an illumination beam, and the brightness controlling circuit is configured to control the light source. The processor is coupled to the distance sensor, the light source, and the brightness controlling circuit. The processor calculates according to the distance to obtain an image size of a projected image on the projection plane. The processor obtains a current value corresponding to the image size according to a color table. The processor instructs the light source to adjust a luminous flux of the illumination beam according to the current value for generating a target brightness value of the projected image.

In order to achieve one or a portion of or all of the objectives or other objectives, an embodiment of the invention provides a brightness adjusting method adapted to a projector, and the brightness adjusting method includes: detecting by a distance sensor a distance between the projector and a projection plane; calculating by a processor according to the distance to obtain an image size of a projected image on the projection plane; obtaining by the processor a current value corresponding to the image size according to a color table; instructing by the processor the light source to adjust a luminous flux of the illumination beam according to the current value for generating a target brightness value of the projected image.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
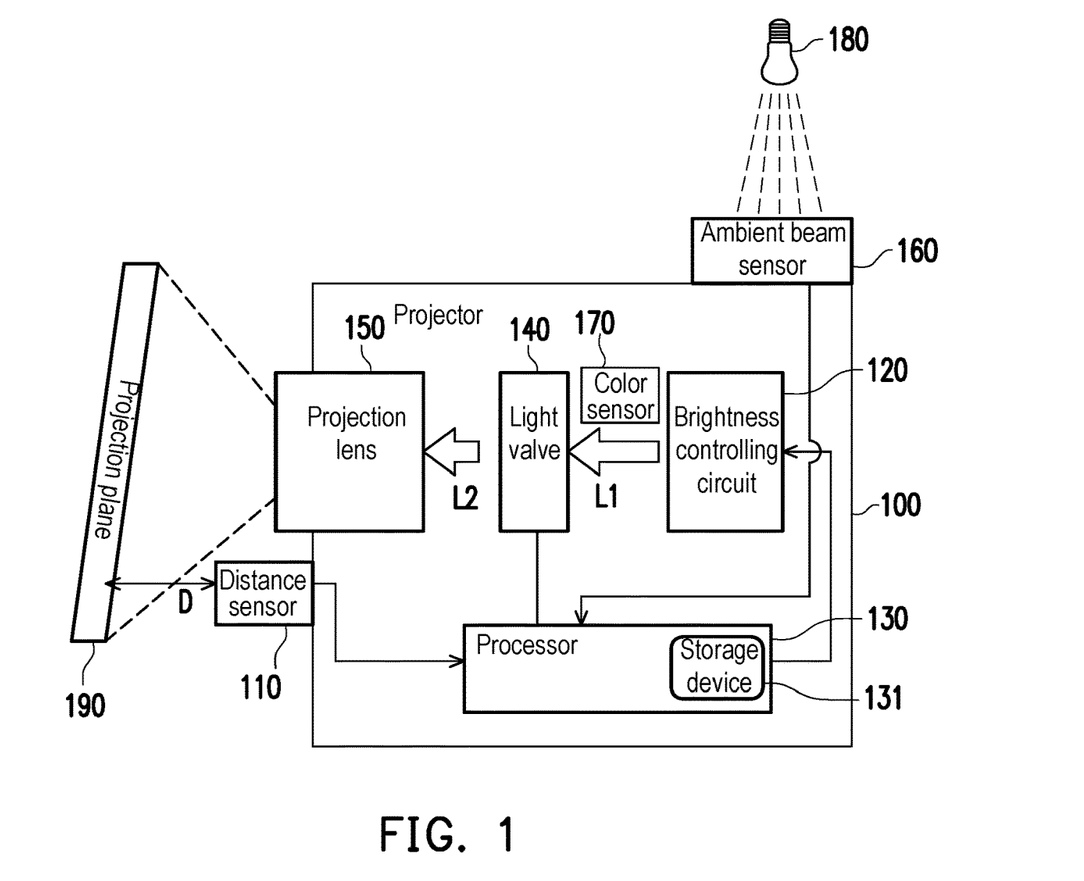
FIG. 1 is a block view of a projector according to an embodiment of the invention.
Figure 2:
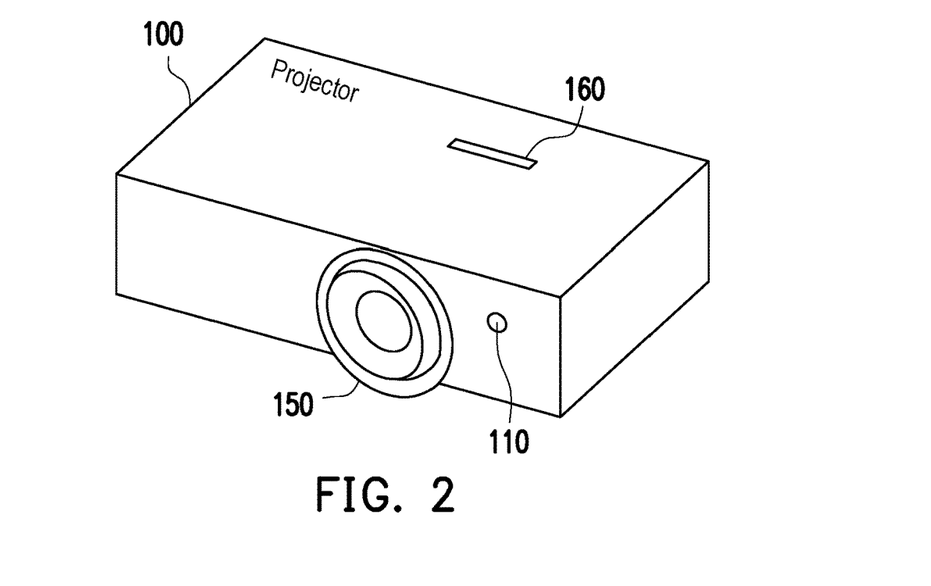
FIG. 2 is a schematic view of a projector according to an embodiment of the invention.

FIG. 1 is a block view of a projector according to an embodiment of the invention. FIG. 2 is a schematic view of a projector according to an embodiment of the invention.

With reference to FIG. 1 and FIG. 2, a projector 100 provided in an embodiment of the invention includes a distance sensor 110, a light source and brightness controlling circuit 120, and a processor 130. The processor 130 is coupled (electrically connected) to the distance sensor 110 as well as the light source and brightness controlling circuit 120. The distance sensor 110 can detect a distance D between the distance sensor 110 and a projection plane 190. That is, the distance sensor 110 is able to detect the distance D between the projector 100 and the projection plane 190. The distance sensor 110 is, for instance, a proximity sensor. Besides, the distance sensor 110 can detect the distance with use of infrared ray, laser, ultrasonic wave, sound wave, photoelectric sensing, and so on, which should not be construed as a limitation to the invention. In the light source and brightness controlling circuit 120, the light source is, for instance, a light-emitting diode (LED), a laser beam source, or any other similar light-emitting component. The brightness controlling circuit is a known circuit configured to provide a current to the light source, so as to control the output luminous flux of the light source. The brightness controlling circuit is controlled by the processor 130 and configured to adjust the luminous flux of an illumination beam L1 output by the light source. The processor 130 is, for instance, a microprocessor control unit (MCU) or any other similar component. The processor 130 includes a storage device 131. The processor 130 may obtain a current value of an image size corresponding to the projected image according to a color table and instruct the light source and brightness controlling circuit 120 to adjust the luminous flux of the illumination beam L1 according to the current value. The so-called current value is the intensity of the current to be received by the light source. The color table can be stored in the storage device 131. The light valve 140 can be configured to modulate the illumination beam L1. If an image signal source (e.g., a computer or smart phone outside the projector) transmits an image signal to the projector 100, and the image signal is input to the light valve 140 through the processor 130, the light valve 140 converts the illumination beam L1 into an image beam L2. The image beam L2 is projected to the projection plane 190 through a projection lens 150. The projection plane 190 is a projection screen or a wall. The projector 100 can include an ambient beam sensor 160 configured to sense an ambient beam emitted by an ambient light source 180 and transmit a numeral value corresponding to the brightness of the ambient beam to the processor 130. The color sensor 170 may be disposed in the projector 100 and next to a transmission path of the illumination beam L1. In the present embodiment, the color sensor 170 can be disposed between the light source and brightness controlling circuit 120 and the light valve 140 and next to the transmission path of the illumination beam L1.

Figure 3:
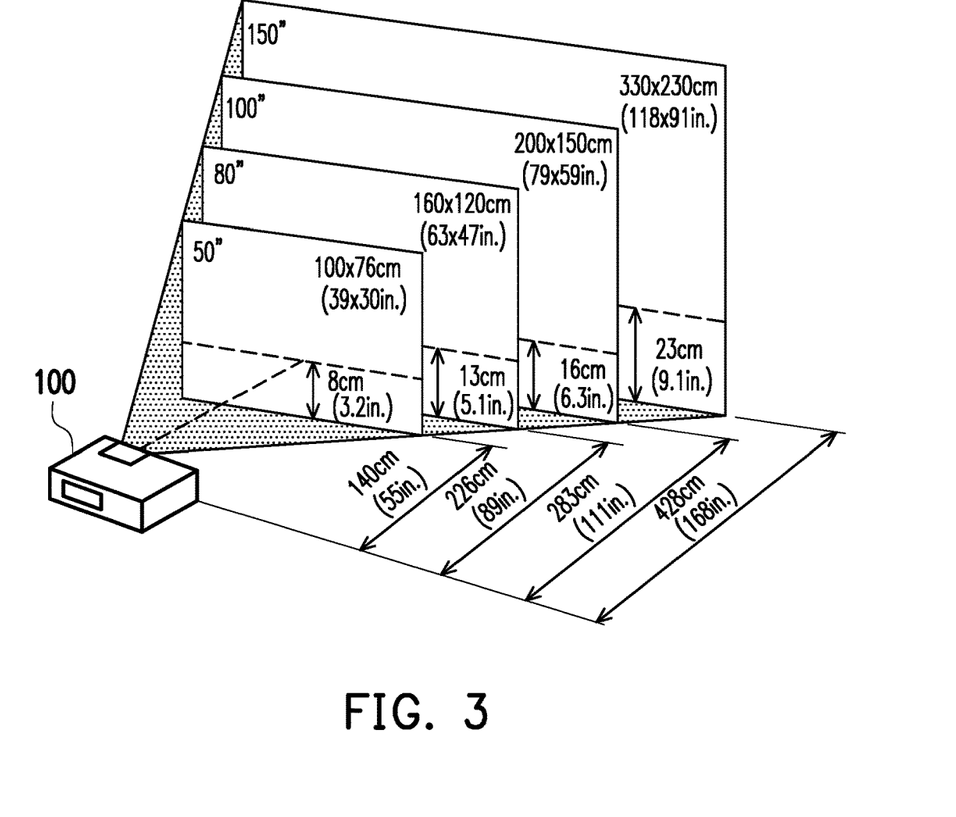
FIG. 3 is a schematic view of a projection distance and an image size of a projected image according to an embodiment of the invention.

In an embodiment, the processor 130 calculates according to the distance D and obtains the image size of the projected image on the projection plane 190. Specifically, the processor 130 calculates the size of the projected image according to the distance D, a throw ratio predetermined by the projector 100, and a length-width ratio predetermined by the projector 100. FIG. 3 is a schematic view of a projection distance and an image size of a projected image according to an embodiment of the invention. With reference to FIG. 3, for instance, the image size of the projected image is 50", and when the distance sensor 110 detects that the distance D=140 cm, the processor 130 may calculate to obtain the length and the width of the projected image as 100 cm and 76 cm according to the default/predetermined throw ratio 1.41 and the length-width ratio 4:3 predetermined by the projector 100; according to the length and the width of the projected image, the processor 130 can further calculate to learn that the length of a diagonal of the projected image is 50". The throw ratio is a ratio of a projection distance to the length of the projected image, and the length-width ratio of the projected image is a ratio of the length to the width of the projected image. Note that 8 cm, 13 cm, 16 cm, and 23 cm shown in FIG. 3 can be changed together with changes to the included angle between the optical axis of the projector 100 and the horizontal plane.

After the processor 130 calculates the image size corresponding to the distance D, the processor 130 obtains the current value corresponding to the image size of the projected image according to the color table, the processor 130 instructs the light source and brightness controlling circuit 120 to adjust the luminous flux of the illumination beam L1 according to the current value for generating a default target brightness value of the projected image (e.g., 55 nits recommended by the SMTPE). In an embodiment, the current value includes a first current value corresponding to a red beam, a second current value corresponding to a green beam, and a third current value corresponding to a blue beam. The first current value, the second current value, and the third current value respectively correspond to a pulse width modulation (PWM) signal. The color table includes the image size as well as the brightness value, the first current value, the second current value, and the third current value corresponding to the image size.

In an embodiment, the processor 130 obtains a first brightness value of the projected image by looking up the image size and the luminous flux of the illumination beam L1 of the light source and brightness controlling circuit 120 in the lookup table. When the first brightness value is greater than a predetermined brightness value (e.g., 55 nits), the processor 130 instructs the light source and brightness controlling circuit 120 to reduce the luminous flux of the illumination beam L1 according to a ratio change way, so that a difference between the target brightness value of the projected image and the predetermined brightness value is less than an error value. In an embodiment, the processor 130 obtains the first brightness value of the projected image by looking up the image size and the luminous flux of the illumination beam L1 of the light source and brightness controlling circuit 120 in the lookup table. When the first brightness value is less than or approximately equal to the predetermined brightness value (e.g., 55 nits), the processor does not instruct the light source and brightness controlling circuit 120 to reduce the luminous flux. The lookup table can be stored in the storage device 131. The storage device 131 is, for instance, an electrically-erasable programmable read-only memory (EEPROM) or any other similar component and can be installed in the processor 130 or arranged outside the processor 130 and coupled to the processor 130. Table 2 is an exemplary lookup table.

TABLE 2

(the luminous flux is 1500 and 3000, for instance)

| Image Size | Luminous Flux | First Brightness Value | Ratio Change Way | Target Brightness Value |
|---|---|---|---|---|
| 60" | 1500 | 457 | 1/8.3(12%) | 55 |
| 70" | 1500 | 336 | 1/6.2(16.1%) | 54.2 |
| 80" | 1500 | 257 | 1/4.7(21.3%) | 54.7 |
| 90" | 1500 | 203 | 1/3.7(27%) | 54.9 |
| 100" | 1500 | 165 | 1/3(33.3%) | 54.3 |
| 110" | 1500 | 136 | 1/2.5(40%) | 54.4 |
| 120" | 1500 | 114 | 1/2.1(47.6%) | 54.2 |
| 130" | 1500 | 97 | 1/1.8(55.6%) | 53.9 |
| 140" | 1500 | 84 | 1/1.6(62.5%) | 52.5 |
| 150" | 1500 | 73 | 1/1.4(71.4%) | 55 |
| 60" | 3000 | 915 | 1/16.7(6%) | 54.8 |
| 70" | 3000 | 672 | 1/12.2(8.2%) | 55 |
| 80" | 3000 | 515 | 1/9.4(10.6%) | 54.8 |
| 90" | 3000 | 407 | 1/7.4(13.5%) | 55 |
| 100" | 3000 | 329 | 1/6.0(16.7%) | 54.8 |
| 110" | 3000 | 272 | 1/5.0(20%) | 54.4 |
| 120" | 3000 | 229 | 1/4.2(23.8%) | 54.5 |
| 130" | 3000 | 195 | 1/3.6(27.8%) | 54.2 |
| 140" | 3000 | 168 | 1/3.1(32.3%) | 54.2 |
| 150" | 3000 | 146 | 1/2.7(37%) | 54.1 |

In an embodiment, if the image size falls between the range from 60" to 150" and is not included in Table 2, the ratio change way can be calculated through interpolation. If the image size is less than 60" or greater than 150", the ratio change way can be calculated through extrapolation.

In an embodiment, through the image size and the luminous flux of the illumination beam L1 of the light source input to the calculation formula, the processor 130 calculates and obtains the first brightness value of the projected image. When the first brightness value is greater than the predetermined brightness value, the processor 130 instructs the light source and brightness controlling circuit 120 to reduce the luminous flux according to the ratio change way, so that the difference between the target brightness value of the projected image and the predetermined brightness value is less than the error value. Table 2 is taken as an example, and it can be learned that the error value is approximately (55−52.5)/55×100%=4.54%, but the invention is not limited thereto. In other embodiments, the error value can be set to be equal to or less than 5%.

For instance, the processor 130 can execute the firmware stored in the storage device 131, so as to calculate and obtain the first brightness value of the projected image through the image size and the luminous flux of the illumination beam L1 of the light source input to the calculation formula in the firmware. If the image size is 60", and the luminous flux is 3000, for instance, the first brightness value calculated by the processor 130 is 915. Since the first brightness value (i.e., 915) is greater than the predetermined brightness value (i.e., 55), the processor 130 instructs the light source and brightness controlling circuit 120 to reduce the luminous flux (to 6% of the original luminous flux) according to the ratio change way (e.g., 1/16.7), so that the difference between the target brightness value (54.8 nits) of the projected image and the predetermined brightness value (55 nits) is less than the error value.

[Method of Establishing Color Table]

Figure 4:
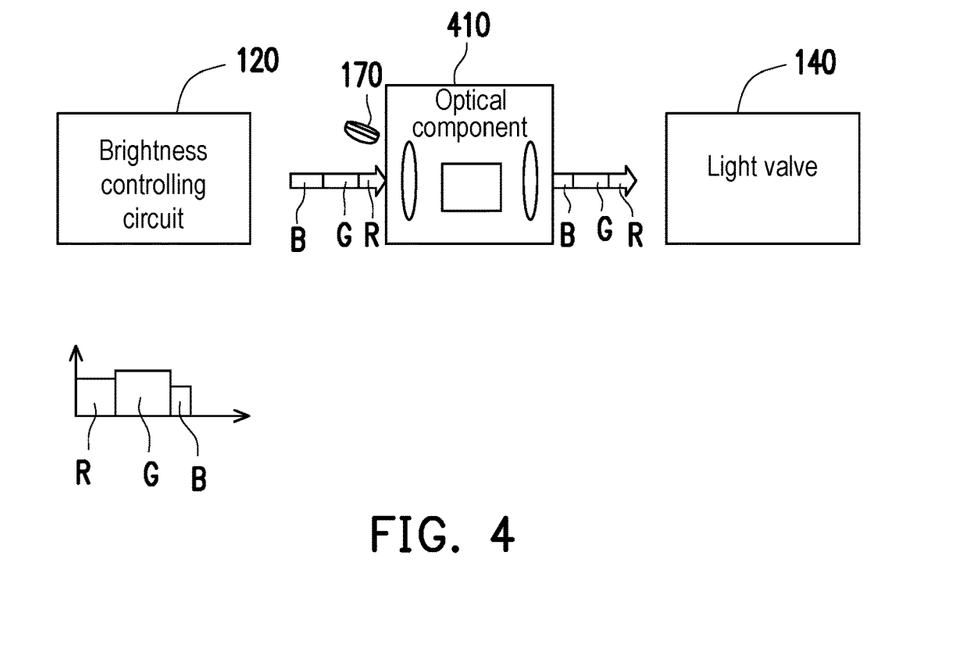
FIG. 4 is a schematic view of performing a white point correction on a light source according to an embodiment of the invention.

FIG. 4 is a schematic view of performing a white point correction on a light source according to an embodiment of the invention.

With reference to FIG. 4, the color sensor 170 can be arranged between the light source and brightness controlling circuit 120 and the light valve 140 and next to a transmission path of the illumination beam L1 and can sense the intensity of RGB beams. An optical component 410 may be disposed between the light source and brightness controlling circuit 120 and the light valve 140. The light source and brightness controlling circuit 120 may include R, B light-emitting diodes (LEDs), a laser beam source, or any other similar light-emitting component, and the light valve 140 may be a digital micromirror device (DMD). In an embodiment, white point correction can be done by adjusting sequence duty of the light source and brightness controlling circuit 120 and/or the PWM of the RGB beams. In another embodiment, the white point correction can also be done by adjusting the on/off duty of the light valve 140.

Figure 5:
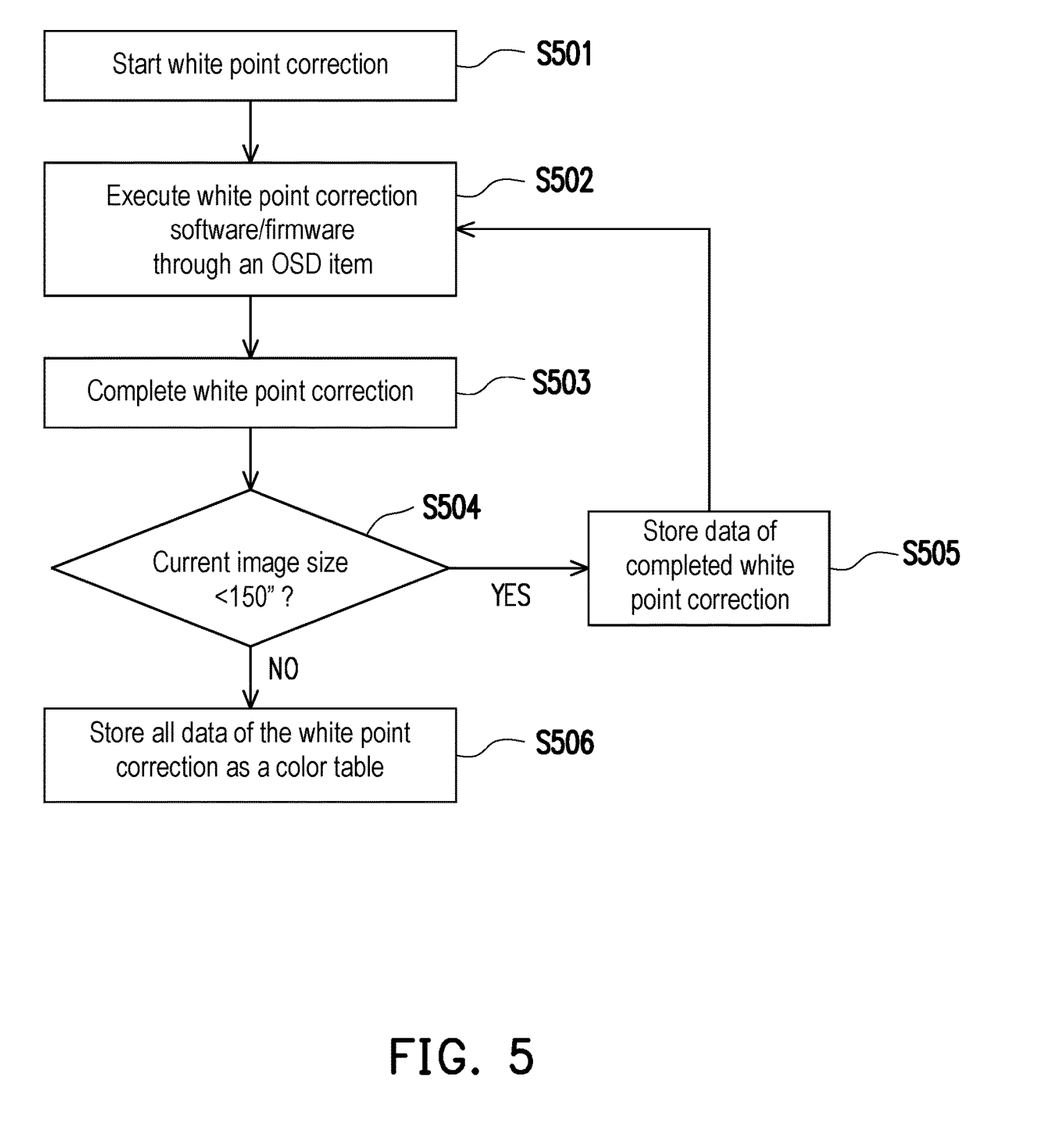
FIG. 5 is a flowchart of a method of establishing a color table according to an embodiment of the invention.

FIG. 5 is a flowchart of a method of establishing a color table according to an embodiment of the invention.

With reference to FIG. 5, in step S501, white point correction starts to be performed on an image size of a 60" image.

In step S502, white point correction software/firmware is executed through an on screen display (OSD) item.

In step S503, the white point correction is completed.

In step S504, it is determined whether the current image size is less than 150".

If the current image size is less than 150", in step S505, the data of the completed white point correction are stored, and 10" is added to the current image size. Next, go back to step S502 to continuously execute the white point correction software/firmware.

If the current image size is greater than or equal to 150", in step S506, all data of the white point correction are stored as a color table. Specifically, the color table may include the image size, the brightness, the first current value corresponding to the red beam, the second current value corresponding to the green beam, and the third current value corresponding to the blue beam, and the first current value, the second current value, and the third current value respectively correspond to the PWM signal. Note that the color table may also correspond to a theater mode with the darker ambient beam, a report mode with the brighter ambient beam, or another mode. In different modes, the same image size corresponds to different current values. Table 3 is an exemplary color table.

TABLE 3

| Mode | Table 2 | Image Size | Brightness | R | G | B |
|---|---|---|---|---|---|---|
| Theater | Max 10 row | 60-150" | Max 1200 nits | PWM 0-1023 | PWM 0-1023 | PWM 0-1023 |

Note that the color table may not include all of the image sizes. If the image size does not exist in the color table, the processor 130 can obtain the current value (i.e., the first current value, the second current value, and the third current value) corresponding to the image size according to the color table through interpolation or extrapolation. For instance, if the image size is 65", the processor 130 can calculate the current value corresponding to 65" according to the data corresponding to 60" and 70" in the color table through interpolation. If the image size is 160", the processor 130 can calculate the current value corresponding to 150" according to the data corresponding to 150" and 140" in the color table through extrapolation.

Figure 6:
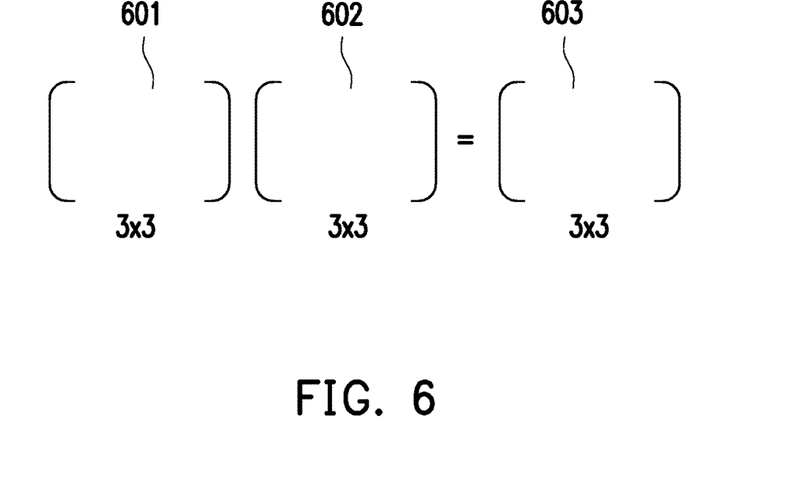
FIG. 6 is a schematic view of obtaining a color point during white point correction through conversion of coordinates.

FIG. 6 is a schematic view of obtaining a color point during white point correction through conversion of coordinates.

With reference to FIG. 6, a color sensor pulse count 602 can be converted to a RGB color point 603 through a correction matrix 601. Each of the color sensor pulse count 602, the correction matrix 601, and the RGB color point 603 is a 3×3 matrix. The correction matrix 601 is a default value of the projector 100.

Figure 7:
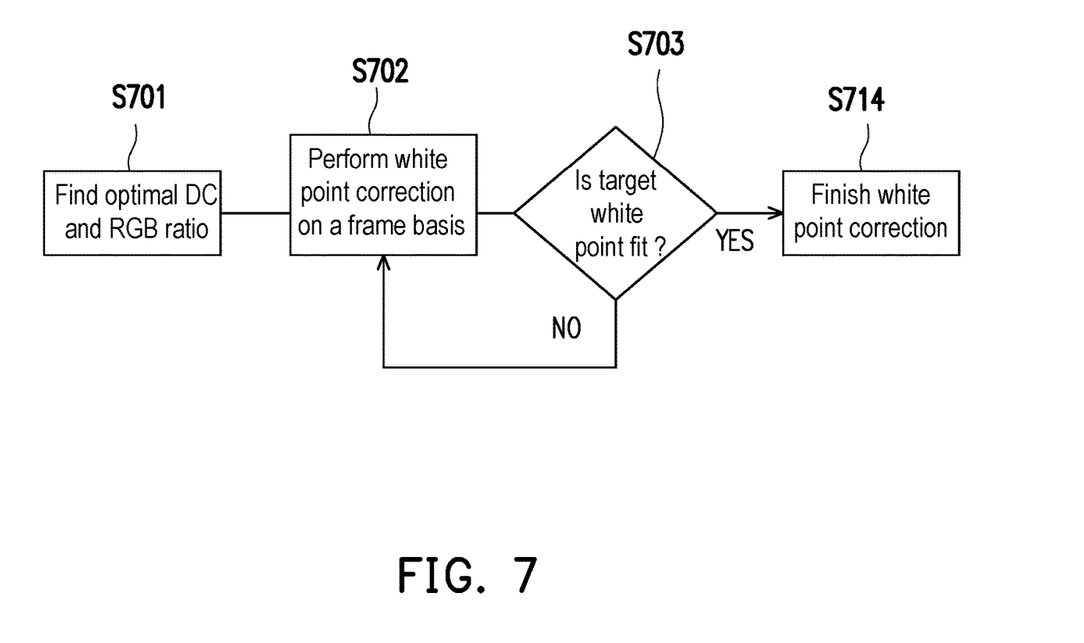
FIG. 7 is a flowchart illustrating details of white point correction according to an embodiment of the invention.

FIG. 7 is a flowchart illustrating details of white point correction according to an embodiment of the invention.

With reference to FIG. 7, in step S701, an optimal duty cycle (DC) and a RGB ratio is found. Specifically, the processor 130 may select one set of optimal DC from a plurality of DCs according to a target color point and calculate an initial RGB current value.

In step S702, white point correction on a frame basis is performed, i.e., the white point correction is performed on an image frame.

In step S703, determining whether a target white point is fit.

If the target white point is fit, in step S704, the white point correction is finished.

In case of the target white point being not fit, go back to step S702 to perform the white point correction on the frame basis. The RGB current value is continuously adjusted to fit the target white point.

[Low Current Circuit]

If the current is required to be reduced to be less than a threshold value, the projector 100 activates the low current circuit to provide a low current value to the light source and brightness controlling circuit 120.

Figure 8A:
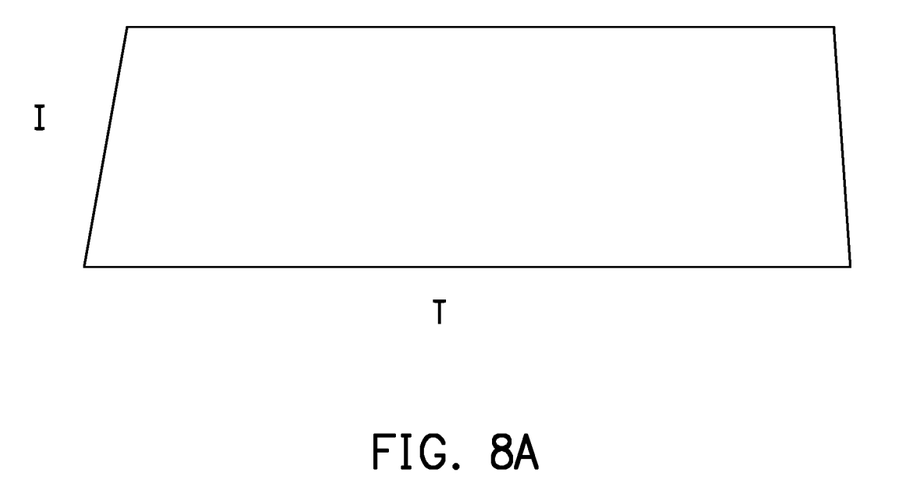
FIG. 8A is a schematic view of a 100%-light pulse according to an embodiment of the invention.
Figure 8B:
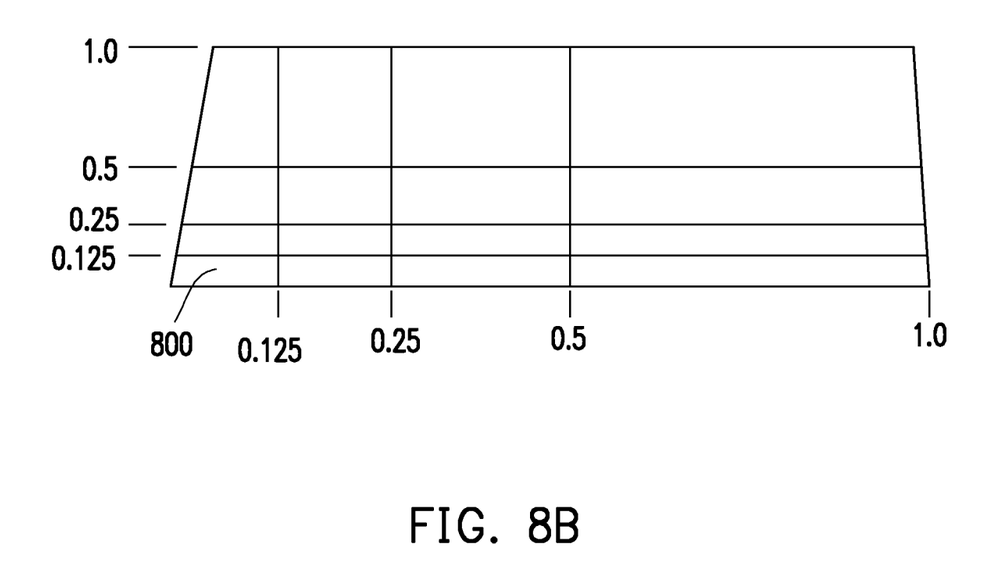
FIG. 8B is a schematic view of cutting a light pulse according to time or amplitude according to an embodiment of the invention.

FIG. 8A is a schematic view of a 100%-light pulse according to an embodiment of the invention. FIG. 8B is a schematic view of dividing a light pulse according to time or amplitude according to an embodiment of the invention. In FIG. 8A, FIG. 8B and the following FIG. 9A, FIG. 9B, FIG. 10A, FIG. 10B, and FIG. 10C , the horizontal axis represents time, and the vertical axis represents current (or the amplitude of the current).

With reference to FIG. 8A, the 100%-light pulse is generated while the amplitude of the current reaches the maximum value for a period of time. With reference to FIG. 8B, the light pulse is cut according to time and amplitude. A light pulse corresponding to a region 800 (i.e., a region where the time and the amplitude are within 0.125) is equal to 1/64 the 100%-light pulse depicted in FIG. 8A. In other words, the region 800 represents 1/64 the maximum current value.

Figure 9A:
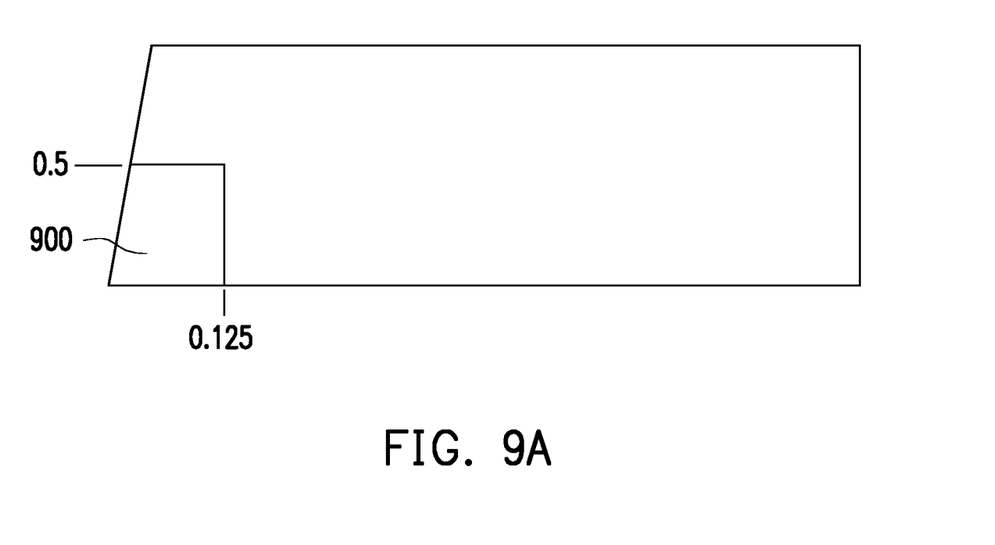
FIG. 9A is a schematic view of a continuous light pulse according to an embodiment of the invention.
Figure 9B:
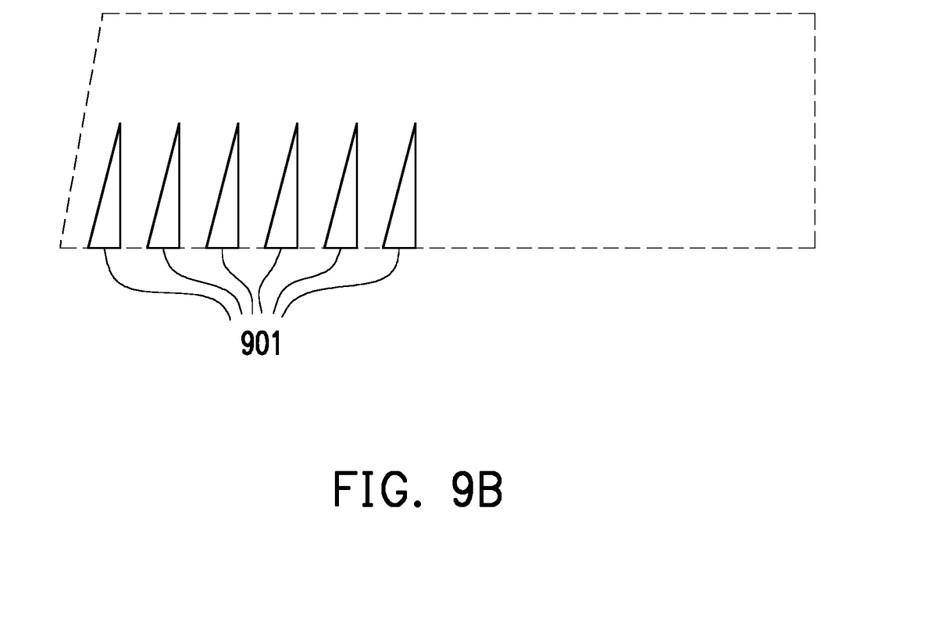
FIG. 9B is a schematic view of a non-continuous light pulse of a low current circuit according to an embodiment of the present invention.

FIG. 9A is a schematic view of a continuous light pulse according to an embodiment of the invention. FIG. 9B is a schematic view of a non-continuous light pulse of a low current circuit according to an embodiment of the present invention.

With reference to FIG. 9A, the light pulse corresponding to a region 900 is equal to 1/16 the 100%-light pulse depicted in FIG. 8A, and the region 900 is continuous. With reference to FIG. 9B, the area of six regions 901 is equal to the area of the region 900, but the six regions 901 are not continuous.

Figure 10A:
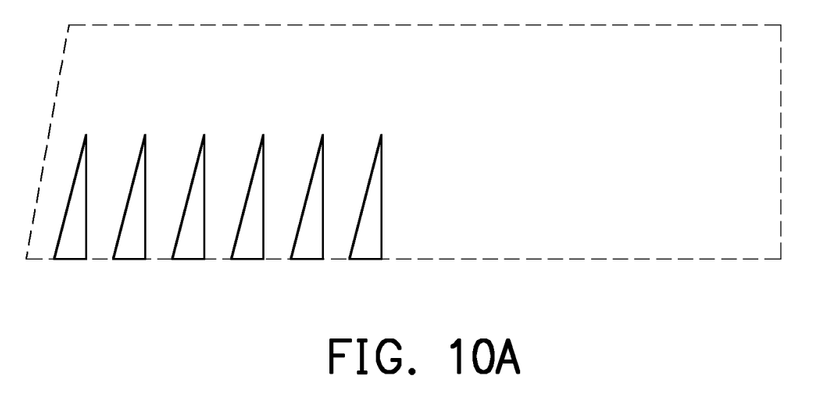
FIG. 10A is a schematic view of 1/16 of a 100%-light pulse of a low current circuit according to an embodiment of the invention.
Figure 10B:
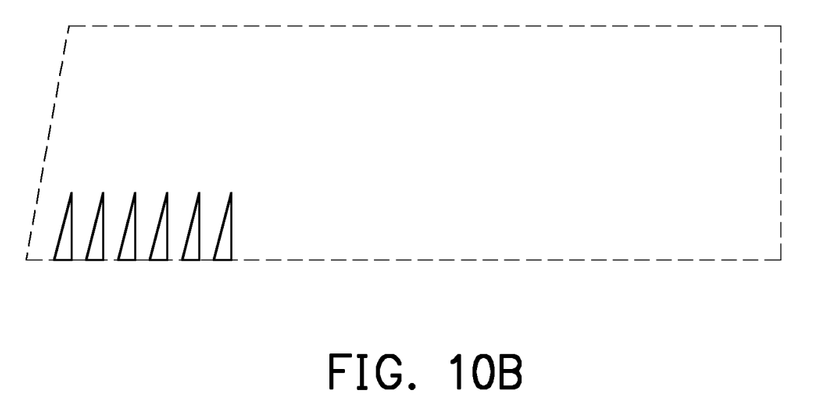
FIG. 10B is a schematic view of reduction of 1/16 of the 100%-light pulse to 1/32 of the 100%-light pulse through amplitude dimming by a low current circuit to an embodiment of the invention.
Figure 10C:
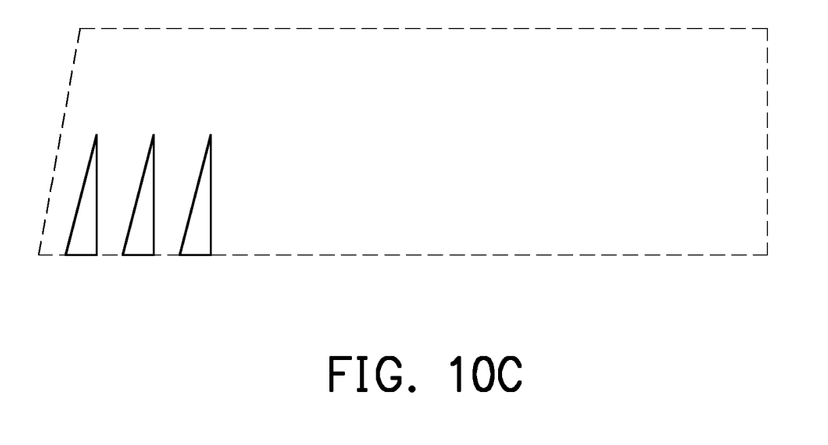
FIG. 10C is a schematic view of reduction of 1/16 of the 100%-light pulse to 1/32 of the 100%-light pulse through pulse count reduction by a low current circuit to an embodiment of the invention.

FIG. 10A is a schematic view of 1/16 of a 100%-light pulse of a low current circuit according to an embodiment of the invention. FIG. 10B is a schematic view of reduction of 1/16 of the 100%-light pulse to 1/32 of the 100%-light pulse through amplitude dimming by a low current circuit to an embodiment of the invention. FIG. 10C a schematic view of reduction of 1/16 of the 100%-light pulse to 1/32 of the 100%-light pulse through pulse count reduction by a low current circuit to an embodiment of the invention. The pulse count in FIG. 10B is the same as that in FIG. 10A, but the amplitude in FIG. 10B is 1/2 the amplitude in FIG. 10A. The pulse count in FIG. 10C is 1/2 the pulse count in FIG. 10A, while the amplitude in FIG. 10C is the same as that in FIG. 10. Hence, FIG. 10B and FIG. 10C both show the energy accumulated by 1/32 of the 100%-light pulse current.

[Current Compensation after Brightness Decay]

In an embodiment, the color sensor 170 can be disposed on a transmission path of the illumination L1 adjacent to the light source and brightness controlling circuit 120. When the color sensor 170 detects that a ratio of the intensity of the red beam, the green beam, and the blue beam emitted by the light source according to a predetermined current to a predetermined intensity of the predetermined current is less than a predetermined percentage, the processor 130 raises the intensity of the red beam, the green beam, and the blue beam to be equal to the predetermined intensity of the predetermined current.

Specifically, after the projector 100 is being used for a period of time, the brightness of the light source is decayed, and the level of decay of the brightness of individual RGB may be different from each other. Hence, in the process of booting or in a theater mode, the color sensor 170 can detect the current light intensity of the individual RGB colors and compare the same with the light intensity of the RGB colors after the projector 100 is manufactured and leaves the factory. If the current light intensity of the individual RGB colors is decayed to be less than the predetermined percentage (e.g., 90%) of the predetermined intensity of the RGB colors while the projector 100 is manufactured and leaves the factory, the processor 130 raises of the individual RGB (also referred to as the PWM of the driving circuit), so that the current light intensity of the individual RGB colors can be raised to the same intensity of the RGB colors after the projector 100 is manufactured and leaves the factory. At the same time of compensating the decayed brightness, the projector 100 can ensure the accuracy of the color temperature under the same light intensity.

Figure 11:
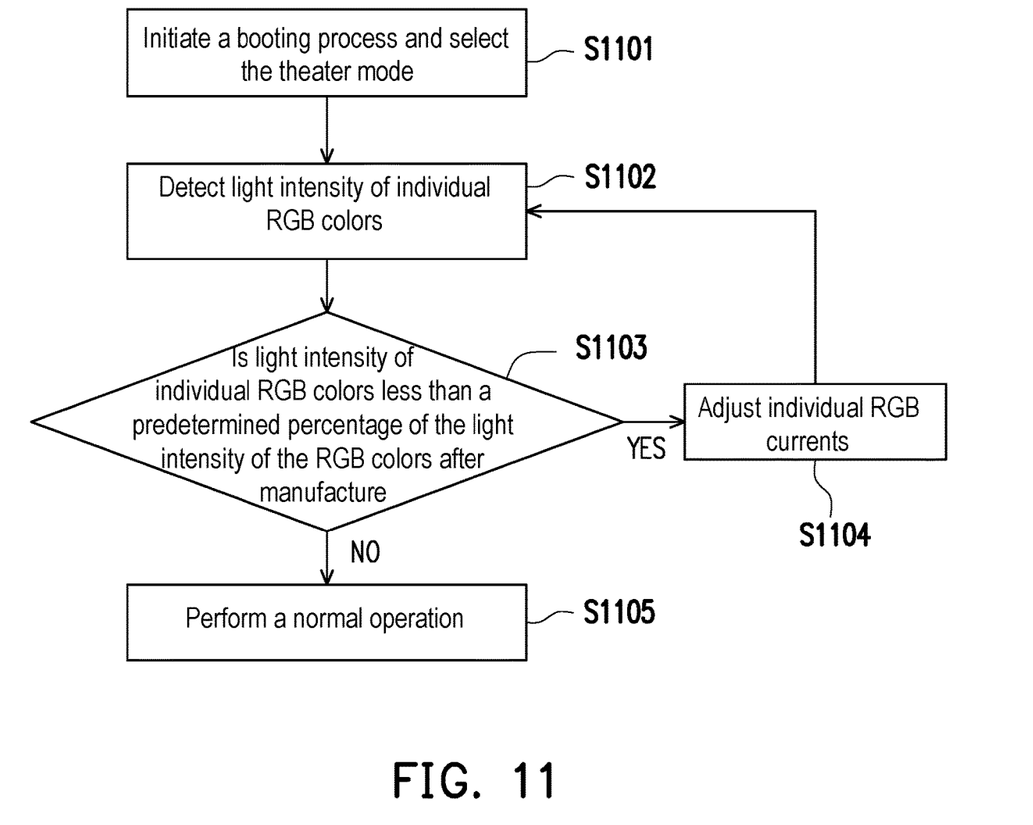
FIG. 11 is a flowchart illustrating current compensation after brightness decay according to an embodiment of the invention.

FIG. 11 is a flowchart illustrating a current compensation method after brightness decay according to an embodiment of the invention.

With reference to FIG. 11, in step S1101, the user initiates a booting process and selects the theater mode.

In step S1102, the color sensor 170 detects light intensity of individual RGB colors.

In step S1103, it is determined whether the light intensity of the individual RGB colors is less than a predetermined percentage of the light intensity of the RGB colors after manufacture.

If the light intensity of the individual RGB colors is less than the predetermined percentage of the light intensity of the RGB colors after manufacture, in step S1104, the individual RGB currents are adjusted. Next, go back to step S1102 to re-detect the light intensity of the RGB colors.

If no light intensity of the individual RGB colors is less than the predetermined percentage of the light intensity of the RGB colors after manufacture, the user performs the normal operation in step S1105.

To sum up, according to the projector and the brightness adjusting method provided in one or more embodiments of the invention, the distance between the projector and the projection plane is detected, the image size of the projected image is calculated according to the distance, the current value corresponding to the image size is obtained according to the color table, and the luminous flux of the illumination beam is adjusted according to the current value, so as to generate the target brightness value of the projected image suitable for the user. Besides, one or more embodiments of the invention further provide a method of providing a super low current to the light source of the projector, so that the projector is allowed to project the projected image with the low brightness. One or more embodiments of the invention further provide a current compensating method performed after the brightness decay, so that the projector is able to automatically compensate the decayed brightness after being used a period of time.

The projector provided herein is adapted to a home theater projector and complies with the requirement for users to comfortably watch images with proper brightness.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present invention is intended to be dedicated to the public regardless of whether the element or component is explicitly recited in the following claims.

What is claimed is:

1. A projector comprising a distance sensor, a light source, a brightness controlling circuit, and a processor, wherein
the distance sensor is configured to detect a distance between the projector and a projection plane,
the light source is configured to provide an illumination beam,
the brightness controlling circuit is configured to control the light source, and
the processor is coupled to the distance sensor, the light source, and the brightness controlling circuit, wherein
the processor calculates according to the distance to obtain an image size of a projected image on the projection plane, obtains a current value according to a color table, and instructs the light source to adjust a luminous flux of the illumination beam according to the current value for generating a target brightness value of the projected image, wherein the current value is an intensity of a current to be received by the light source, and the color table comprises the image size and the current value corresponding to the image size.

2. The projector according to claim 1, wherein the processor comprises a lookup table, the processor obtains a first brightness value of the projected image by looking up the image size and the luminous flux of the illumination beam of the light source in the lookup table, and when the first brightness value is greater than a predetermined brightness value, the processor instructs the light source to reduce the luminous flux of the illumination beam according to a ratio change way, so that a difference between the target brightness value of the projected image and the predetermined brightness value is less than an error value.

3. The projector according to claim 1, wherein the processor comprises a calculation formula, and through the image size and the luminous flux of the illumination beam of the light source input to the calculation formula the processor calculates and obtains a first brightness value of the projected image, when the first brightness value is greater than a predetermined brightness value, the processor instructs the light source to reduce the luminous flux of the illumination beam according to a ratio change way, so that a difference between the target brightness value of the projected image and the predetermined brightness value is less than an error value.

4. The projector according to claim 1, wherein the processor calculates the image size according to the distance, a throw ratio of the projector, and a length-width ratio of the projected image.

5. The projector according to claim 1, wherein the current value comprises a first current value corresponding to a red beam, a second current value corresponding to a green beam, and a third current value corresponding to a blue beam, and the first current value, the second current value, and the third current value respectively correspond to a pulse width modulation signal.

6. The projector according to claim 5, wherein the color table further comprises a brightness value, the first current value, the second current value, and the third current value corresponding to the image size.

7. The projector according to claim 1, wherein if the image size does not exist in the color table, the processor obtains the current value corresponding to the image size according to the color table through interpolation or extrapolation.

8. The projector according to claim 1, further comprising a low current circuit coupled to the light source, and when the current value is less than a threshold value, the low current circuit outputs the current value to the light source through non-continuous amplitude dimming in a corresponding current-time diagram.

9. The projector according to claim 1, further comprising a low current circuit coupled to the light source, and when the current value is less than a threshold value, the low current circuit reduces an output of the current to the light source through non-continuous pulse count in a corresponding current-time diagram.

10. The projector according to claim 1, further comprising a color sensor disposed adjacent to a transmission path of the illumination beam of the light source, and when the color sensor detects that a ratio of an intensity of a red beam, a green beam, or a blue beam emitted by the illumination beam of the light source according to a predetermined current to a predetermined intensity corresponding to the predetermined current is less than a predetermined percentage, the processor raises the predetermined current until the intensity is equal to the predetermined intensity.

11. A brightness adjusting method adapted to a projector and comprising:
detecting by a distance sensor a distance between the projector and a projection plane;
calculating by a processor according to the distance to obtain an image size of a projected image on the projection plane;
obtaining by the processor a current value according to a color table; and
instructing by the processor the light source to adjust a luminous flux of the illumination beam according to the current value for generating a target brightness value of the projected image, wherein the current value is an intensity of a current to be received by the light source, and the color table comprises the image size and the current value corresponding to the image size.

12. The brightness adjusting method according to claim 11, wherein the processor comprises a lookup table, the processor obtains a first brightness value of the projected image by looking up the image size in the lookup table and the luminous flux of the illumination beam of the light source in the lookup table, and when the first brightness value is greater than a predetermined brightness value, the processor instructs the light source to reduce the luminous flux of the illumination beam according to a ratio change way, so that a difference between the target brightness value of the projected image and the predetermined brightness value is less than an error value.

13. The brightness adjusting method according to claim 11, wherein the processor comprises a calculation formula, and through the image size and the luminous flux of the illumination beam of the light source input to the calculation formula the processor calculates and obtains a first brightness value of the projected image, when the first brightness value is greater than a predetermined brightness value, the processor instructs the light source to reduce the luminous flux of the illumination beam according to a ratio change way, so that a difference between the target brightness value of the projected image and the predetermined brightness value is less than an error value.

14. The brightness adjusting method according to claim 11, wherein the processor calculates the image size according to the distance, a throw ratio of the projector, and a length-width ratio of the projected image.

15. The brightness adjusting method according to claim 11, wherein the current value comprises a first current value corresponding to a red beam, a second current value corresponding to a green beam, and a third current value corresponding to a blue beam, and the first current value, the second current value, and the third current value respectively correspond to a pulse width modulation signal.

16. The brightness adjusting method according to claim 15, wherein the color table further comprises a brightness value, the first current value, the second current value, and the third current value corresponding to the image size.

17. The brightness adjusting method according to claim 11, wherein if the image size does not exist in the color table, the processor obtains the current value corresponding to the image size according to the color table through interpolation or extrapolation.

18. The brightness adjusting method according to claim 11, further comprising: outputting by a low current circuit the current value to the light source through non-continuous amplitude dimming in a corresponding current-time diagram when the current value is less than a threshold value.

19. The brightness adjusting method according to claim 11, further comprising: reducing an output of the current value to the light source by a low current circuit through non-continuous pulse count in a corresponding current-time diagram when the current value is less than a threshold value.

20. The brightness adjusting method according to claim 11, further comprising: when the color sensor detects that a ratio of an intensity of a red beam, a green beam, or a blue beam emitted by the illumination beam of the light source according to a predetermined current to a predetermined intensity corresponding to the predetermined current is less than a predetermined percentage, raising by the processor the predetermined current until the intensity is equal to the predetermined intensity.

\* \* \* \* \*